M. JOHNSON.
Potato Digger.
No. 79,473.
Patented June 30, 1868.
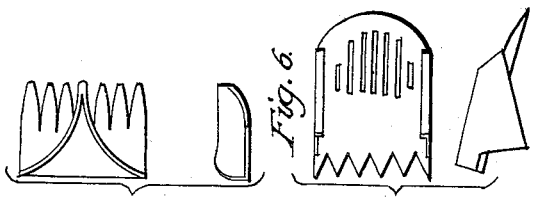
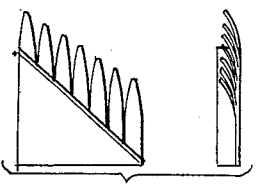
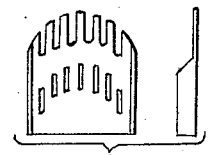
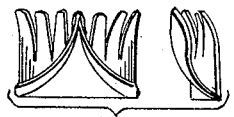
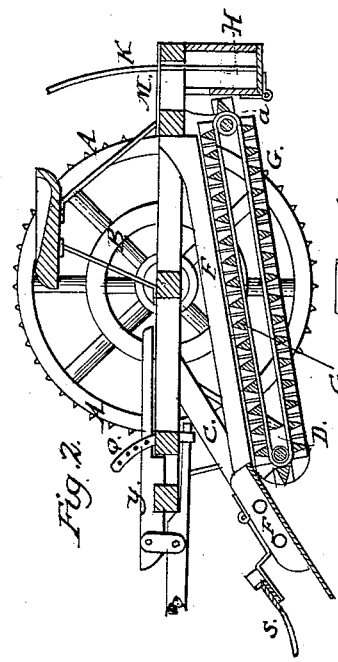
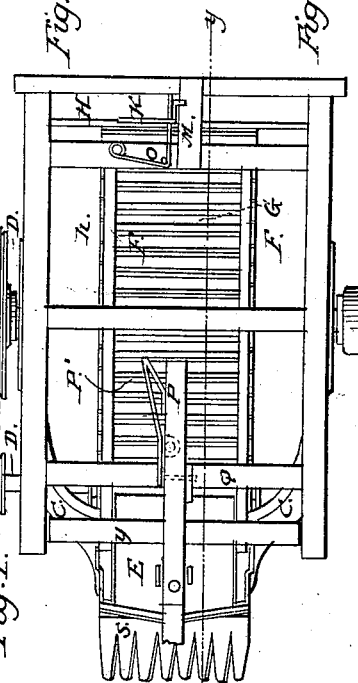
WITNESSES:
INVENTOR:

United States Patent Office.

MOSES JOHNSON, OF THREE RIVERS, MICHIGAN.

Letters Patent No. 79,473, dated June 30, 1868.

IMPROVEMENT IN POTATO-DIGGERS.

The Schedule referred to in these Letters Patent and making part of the same.

TO WHOM IT MAY CONCERN:

Be it known that I, MOSES JOHNSON, of Three Rivers, in the county of St. Joseph, and State of Michigan, have invented a new and valuable Improvement in Potato-Diggers; and I do hereby declare that the following is a full, clear, and exact description of the construction and operation of the same, reference being had to the annexed drawings, making a part of this specification, and to the letters and figures of reference marked thereon.

Figure 1 of the drawings is an inverted plan view of my device.

Figure 2 is a longitudinal section on the line y y of fig. 1, and the remainder of the figures are details.

The nature of my invention consists in providing means for removing the potato-tops, digging the potatoes, sifting the earth therefrom, and depositing them in heaps upon the ground in one continuous process.

My potato-digger is usually constructed with two wheels, as represented, one of which has spurs on its tire or periphery. I call this the spurred carriage-wheel A.

On the inner side of the spurred wheel A, and attached thereto, is a grooved wheel, marked B. This is connected with a grooved head on the roller D, hereinafter mentioned, by a round leather strap, that moves in said grooves respectively.

The letters C are two arms, extending downward diagonally from the main carriage-frame, at an angle with said frame of about forty-five degrees. Between these two arms I adjust the shovel E, by screwing the same by its flanges to said arms in the manner shown. To the lower sides of these arms I also attach the roller D by staples or other suitable means. These arms C are also connected with and partially supported by the two arms, F, that extend from the second cross-beam, from the rear of the carriage-frame, in the manner represented. Immediately under said last-mentioned cross-beam, and attached thereto by staples or otherwise, is the roller a.

The letter G is an endless belt or platform, constructed with leather belts at its sides, and continuous cross-slats, so arranged and adjusted as to allow the earth taken up by the shovel with the potatoes to pass through the interstices.

The letter H is a potato-box, the bottom of which is hinged, and it is so connected with the devices next mentioned that it may be opened or closed readily at the will of the operator.

The letter K is a lever, pivoted at its lower end to the bottom of box H. Passing from the rear beam of the carriage-frame to the beam next in front thereof, is a bar, M. A shoulder on the lever K is adjusted to shut over this bar, and thereby hold the bottom of the potato-box in its place when the same is closed.

The letter O is a spring arranged to hold the lever K against the bar M.

The letter S is a device for removing the potato-tops. It is attached to the arms C by suitable hinges, and hangs at about the same angle as the shovel, and extends about a foot in front thereof. Its office is to remove the potato-tops and all weeds and other like obstructions from the surface of the hill before it is reached by the shovel.

I construct this puller in a variety of forms, all having fingers or teeth as represented. The Figures 3, 7, and 4, and the conformation shown on fig. 1 of the drawings, are among the forms used, but others not herein shown may be profitably constructed and used.

My shovel also may be made in a variety of forms, among which are those represented on Figures 5 and 6. In very light soil, fig. 5 is an excellent form to use. In soil tolerably light, the fig. 6 may be used to advantage, but in heavy or stony soil the usual form, without teeth or openings, is most desirable.

My device for raising or lowering the shovel and puller is an upright or circular arm, Q, in combination with the roller Y and lever and spring P'; the said lever having a pin-attachment, that passes through the lever P and into openings in said arm Q.

What I claim as my invention, and desire to secure by Letters Patent, is—

A potato-digger having wheel A, grooved wheel B, roller D, arms C, shovel E, arms F, belt G, box H, lever K, bar M, spring O, and puller S, constructed, combined, arranged, and operating substantially as set forth.

MOSES JOHNSON.

Witnesses:
L. N. STROM, Jr.,
JNO. S. MOUREY.